United States Patent
Morovic et al.

(10) Patent No.: US 10,416,656 B2
(45) Date of Patent: Sep. 17, 2019

(54) CONTROL DATA FOR PRODUCTION OF A THREE-DIMENSIONAL OBJECT

(71) Applicant: Hewlett-Packard Development Company, L.P., Houston, TX (US)

(72) Inventors: Peter Morovic, Sant Cugat del Valles (ES); Jan Morovic, Colchester (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 165 days.

(21) Appl. No.: 15/514,767

(22) PCT Filed: Oct. 1, 2014

(86) PCT No.: PCT/EP2014/071104
§ 371 (c)(1),
(2) Date: Mar. 27, 2017

(87) PCT Pub. No.: WO2016/050300
PCT Pub. Date: Apr. 7, 2016

(65) Prior Publication Data
US 2017/0220031 A1    Aug. 3, 2017

(51) Int. Cl.
*G05B 19/4099* (2006.01)
*H04N 1/60* (2006.01)
(Continued)

(52) U.S. Cl.
CPC ........ *G05B 19/4099* (2013.01); *B29C 64/386* (2017.08); *B33Y 50/00* (2014.12);
(Continued)

(58) Field of Classification Search
None
See application file for complete search history.

(56) References Cited

U.S. PATENT DOCUMENTS 6,172,692 B1 *   1/2001   Huang .................. B41J 2/2056
                                                   347/100
6,180,049 B1 *   1/2001   Jang .................... C23C 16/4418
                                                   118/694
(Continued)

FOREIGN PATENT DOCUMENTS

EP         1437882        7/2004

OTHER PUBLICATIONS

Cho, Wonjoon, et al., "A dithering algorithm for local composition control with three-dimensional printng", Computer-Aided Design 35 (2003), pp. 851-867.

(Continued)

*Primary Examiner* — Jason A Pringle-Parker
(74) *Attorney, Agent, or Firm* — HP Inc. Patent Department (57) ABSTRACT

Certain examples for generating control data for production of a three-dimensional object are described. In one example, the three-dimensional object to be generated is represented using object model data and object property data. This data is processed to generate a rasterized representation of a plane of the three-dimensional object. The rasterized representation of the plane is then mapped to an area coverage representation defines object property data at a given location in the plane as one or more proportions of a set of available object properties at the location, for example material combinations. The area coverage representation is then halftoned to generate the control data for three-dimensional printing.

11 Claims, 4 Drawing Sheets

(51) Int. Cl.
*B33Y 50/02* (2015.01)
*B33Y 50/00* (2015.01)
*B29C 64/386* (2017.01)

(52) U.S. Cl.
CPC ............... *B33Y 50/02* (2014.12); *H04N 1/60* (2013.01); *G05B 2219/35134* (2013.01); *G05B 2219/49007* (2013.01); *Y02P 80/40* (2015.11)

(56) References Cited

U.S. PATENT DOCUMENTS

| | | |
|---|---|---|
| 8,705,144 B2 | 4/2014 | Gullentops et al. |
| 2010/0125356 A1 | 5/2010 | Shkolnik et al. |
| 2012/0250095 A1 | 10/2012 | Bestmann et al. |
| 2013/0138234 A1* | 5/2013 | Dufort .................... G06T 19/00 700/98 |
| 2014/0277661 A1* | 9/2014 | Amadio ............. G05B 19/4099 700/97 |

OTHER PUBLICATIONS

Cho, Wonjoon, "Halftoning for 3DP", Design Laboratory, MIT Confidential, 6 pages.
International Search Report and Written Opinion for International Application No. PCT/EP2014/071104 dated Jun. 1, 2015, 14 pages.
Stanic, M. et al., "Color and Performance Issues in 3D Ink-jet Printing", MIPRO 2010, pp. 274-277.

* cited by examiner

CONTROL DATA FOR PRODUCTION OF A THREE-DIMENSIONAL OBJECT

BACKGROUND

Additive manufacturing systems that generate three-dimensional objects on a layer-by-layer basis have been proposed as a potentially convenient way to produce three-dimensional objects. These systems typically receive a definition of the three-dimensional object in the form of an object model. This object model is processed to instruct an additive manufacturing system to produce the object using one or more build materials. There are many different types of additive manufacturing systems. The processing of the object model may vary based on the type of additive manufacturing system.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein.

DETAILED DESCRIPTION

Certain examples described herein provide an apparatus and a method for generating control data that may be used to produce a three-dimensional object. Certain examples described herein allow arbitrary three-dimensional content with a variety of desired object properties to be processed and used to generate a three-dimensional object. These object properties may comprise desired material properties, such as color, appearance properties and/or mechanical properties. In particular, certain examples described herein provide an approach for using available build materials such that a desired object property is realized in a produced three-dimensional object. This approach is flexible; it may be used to realize both single color and/or single material objects and multi-color and/or multi-material objects.

In certain examples, data representing a three-dimensional object is processed to generate an area coverage representation of at least a portion of the object. This representation is a probabilistic distribution of one or more build materials. These build materials may have a defined color and thus act as one or more colorants. In certain cases, the area coverage representation determines the amount of each available build material, and their combination or over-deposit if needed, as a proportional area coverage. This differs from comparative systems that use discrete representations of build materials. For example, in certain cases described herein, a set of voxels within object model data may have an associated set of area coverage vectors. In a simple case, such a vector may indicate that X % of one unit of build material should be applied at a given location in three-dimensional space, wherein (100−X) % should be left empty. This differs from a comparative representation where data may indicate one of two discrete states: that either one unit of build material should be applied or that no unit of build material should be applied. In certain examples described herein, the area coverage representation then provides the input for a halftoning process to generate control data that may be used by an additive manufacturing system to produce a three-dimensional object.

Figure 1:
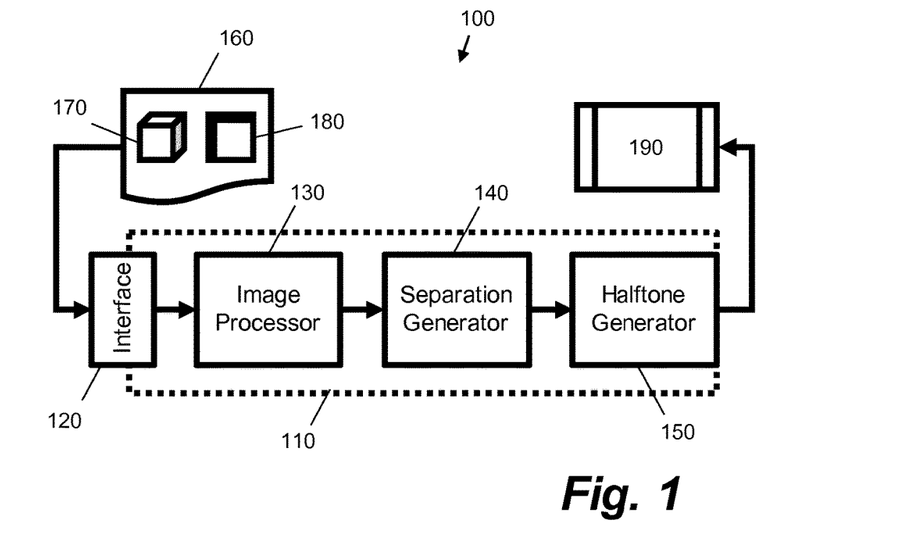
FIG. 1 is a simplified schematic illustration of an apparatus for generating control data for the production of a three-dimensional object according to an example.

FIG. 1 shows an example 100 that may be used to generate control data for production of a three-dimensional object. The example 100 shows an apparatus 110. The apparatus 110 comprises an interface 120, an image processor 130, a separation generator 140 and a halftone generator 150. The apparatus 110 is arranged to receive data representing a three-dimensional object to be generated 160 and to process said data to generate control data 190 for producing at least of portion of the three-dimensional object.

In the example of FIG. 1 the data representing the three-dimensional object to be generated 160 comprises object model data 170 and object property data 180. The object model data 170 may define a three-dimensional model of at least a portion of the object to be generated. The model may define the shape and extent of the object in a three-dimensional co-ordinate system, e.g. the solid portions of the object. The object model data 170 may be generated by a computer aided design (CAD) application. Object property data 180 defines one or more desired object properties for the three-dimensional object to be generated. In one case, the object property data 180 may comprise a color for at least a portion of the object to be generated. The object property data 180 may additionally, or alternatively, comprise other desired material properties for at least a portion of the object to be generated. Object property data 180 may be defined, for example, for the whole of an object to be generated, e.g. global property data, or for one or multiple portions of an object to be generated, e.g. local property data. The object property data 180 may also be used to define multiple object properties for a portion or portions of an object. Object properties other than color may include, for example, flexibility, elasticity, rigidity, surface roughness, porosity, inter-layer strength, density, and the like, and may depend on the type of build material or agents used to generate an object.

The apparatus 110 of FIG. 1 is arranged to transform the data representing the three-dimensional object to be generated 160 into a rasterized representation that is then transformed into an area coverage representation. The area coverage representation is halftoned to generate the control data 190.

In more detail, the interface 120 is arranged to receive the data representing the three-dimensional object to be generated 160. In certain cases the interface may be arranged to receive the object model data 170 and the object property data 180 as a single file; in other cases the interface may be arranged to receive portions of one or more of the object model data 170 and the object property data 180 as multiple data objects, wherein the object model data 170 and the object property data 180 are distributed across a number of associated data structures. In one case, the object model data 170 may comprise voxels that are defined in a three-dimensional space. A given voxel may have associated data that indicates whether a portion of the object to be generated is present at that location. As described above, the object property data 180 may comprise one or more of global and local object property data, e.g. certain object property values as defined in the object property data 180 may be associated with each voxel that defines the object and/or certain object property values may be associated with a set of voxels, e.g. ranging from individual voxels to all voxels associated with the object. In one case, the data representing the three-dimensional object comprises a model of a three-dimensional object that has one or more material properties specified at every location within the model, e.g. at every [x, y, z] co-ordinate.

The image processor 130 is arranged to receive the object model data 170 and the object property data 180 from the interface 120. The image processor 130 is arranged to process at least the object model data 170 and generate a rasterized representation of at least one plane of the three-dimensional object. For example, the image processor 130 may be arranged to generate slices of parallel planes of a model of the three-dimensional object. Each slice may define a portion of a respective layer of build material that is to be produced by an additive manufacturing system. In a three-dimensional space that uses a three-coordinate system, e.g. that uses [x, y, z] co-ordinates, these parallel planes may be z-slices, planes that are parallel to x and y axes. Each z-slice may comprise portions of a model that have one or more common z co-ordinates and that extend in the x and y dimensions. The number of z-slices may depend on a resolution of detail in the z dimension and/or the output resolution of a layer of one or more build materials.

In one case, the image processor 130 is arranged to output a plurality of two-dimensional raster objects, each representing a plane of the three-dimensional space in which the object is defined. Each of these two-dimensional raster objects may comprise an image such as a bitmap. In this case, the image processor 130 is arranged to associate at least one object property value with each location in the raster object. For example, each raster object may comprise a set of pixels that extend in the x and y dimensions; each pixel may then be associated with at least one object property value. In one case, each pixel may be associated with at least one material property. In the case that one of the material properties defines a color, the color may be defined in a color space, such as: a monochrome contone space, e.g. grayscale; a Red, Green, Blue (RGB) color space; the International Commission on Illumination (CIE) 1931 XYZ color space, wherein three variables ('X', 'Y' and 'Z' or tristimulus values) are used to model a color; the CIE 1976 (L*, a*, b*—CIELAB or 'LAB') color space, wherein three variables represent lightness ('L') and opposing color dimensions ('a' and 'b'); or any other color space or derived color space. A color value in these color spaces may comprise a continuous tone value, e.g. a value within a predefined range of values. For example, in a simple case, an RGB color value may comprise three 8-bit values; as such each red, green and blue value may be within the range of 0 to 255. Material properties may be defined implicitly and/or explicitly and may comprise one or more of, amongst others: a value indicating an available build material is to be used; a flexibility value; an elasticity value; a rigidity value; a surface roughness value; a porosity value; a strength value; and a density value. For example, a direct or explicit definition may be of the form "place X % of material Y, Z % of material Q, . . . ". An indirect or implicit definition may specify a particular material property, e.g. a color of X or a rigidity of Y and require a mapping to an explicit combination of available materials.

Still referring to FIG. 1, the separation generator 140 is arranged to receive the output of the image processor 130 and to map a rasterized representation generated by the image processor to an area coverage representation of a plane of the three-dimensional object. In certain cases the separation generator 140 may be arranged to receive raster objects as described above. These may be received one by one, e.g. in an order representative of an ascending height of the object, or as a collection, e.g. all slices of the object. In one case the separation generator 140 is arranged to map a material property to a material area coverage (Mac) vector.

A Mac vector may have a plurality of values, wherein each value defines a proportion for each combination of one or more materials (a "material primary" or MP) in an addressable area of a layer of the three-dimensional object. For example, in an additive manufacturing system with two available materials—M1 and M2, where each material may be independently deposited in an addressable area of a layer of the three-dimensional object, there may be $2^2$ (i.e. four) proportions in a given Mac vector: a first proportion for M1 without M2; a second proportion for M2 without M1; a third proportion for an over-deposit of M1 and M2, e.g. M2 deposited over M1 or vice versa; and a fourth proportion for an absence of both M1 and M2. In this case an Mac vector may be: [M1, M2, M1M2, Z] or with example values [0.2, 0.2, 0.5, 0.1]—i.e. in a given [x, y] location in a z-slice, 20% M1 without M2, 20% M2 without M1, 50% M1 and M2 and 10% empty. As each value is a proportion and the set of values represent the available material combinations, the set of values in each vector must sum to 1 or 100%.

For example, in a case where the build materials are colored, then the Mac vector may be determined to generate select build materials combinations that generate a match with a supplied material property, e.g. a supplied RGB value. This match may be implicit in the mapping.

In FIG. 1 the halftone generator 150 is arranged to receive area coverage representations from the specification generator 140 and to generate a halftone representation of a plane of the three-dimensional object. For example, if each area coverage representation comprises a z-slice with a Mac vector for each [x, y] pixel, then the halftone generator 150 is arranged to output a set of discrete material values for the pixel, wherein the discrete values across the area of the z-slice are representative of the proportions of the set of area coverage representations. In effect, the halftone generator 150 distributes a set of probabilities in the form of area coverage vectors across a given area. In the examples above these discrete material values may comprise discrete material values of the form $[D_{M1}, D_{M2}]$, wherein each of $D_{M1}$, $D_{M2}$ is a binary variable (e.g. has a value of 0 or 1). For example, if in a 5 by 2 pixel area of a z-slice all pixels had a Mac vector value of [0.2, 0.2, 0.5, 0.1] then the halftone generator 150 may be arranged to output discrete material values ($[D_{M1}, D_{M2}]$) of: [1,0], [1,1], [1,1], [0, 0], [0,1]; and [0,1], [1,1], [1,1], [1, 0], [1,1]. The output of the halftone generator 150, in the form of halftone data for one or more planes of the three-dimensional object, forms part of control data 190. The control data 190 may be used to produce at least one plane of the three-dimensional object on a given additive manufacturing system. For example, the discrete material values for the 5 by 2 pixel area may be used to instruct the deposit of one or more of materials M1 and M2 in a given area at a given height. In the example of FIGS. 5A to 5C, 6 and 7 described below, the output of the halftone generator 150 may comprise values for the application of one or more of a coalescing agent and a coalescing modifier agent.

Figure 2:
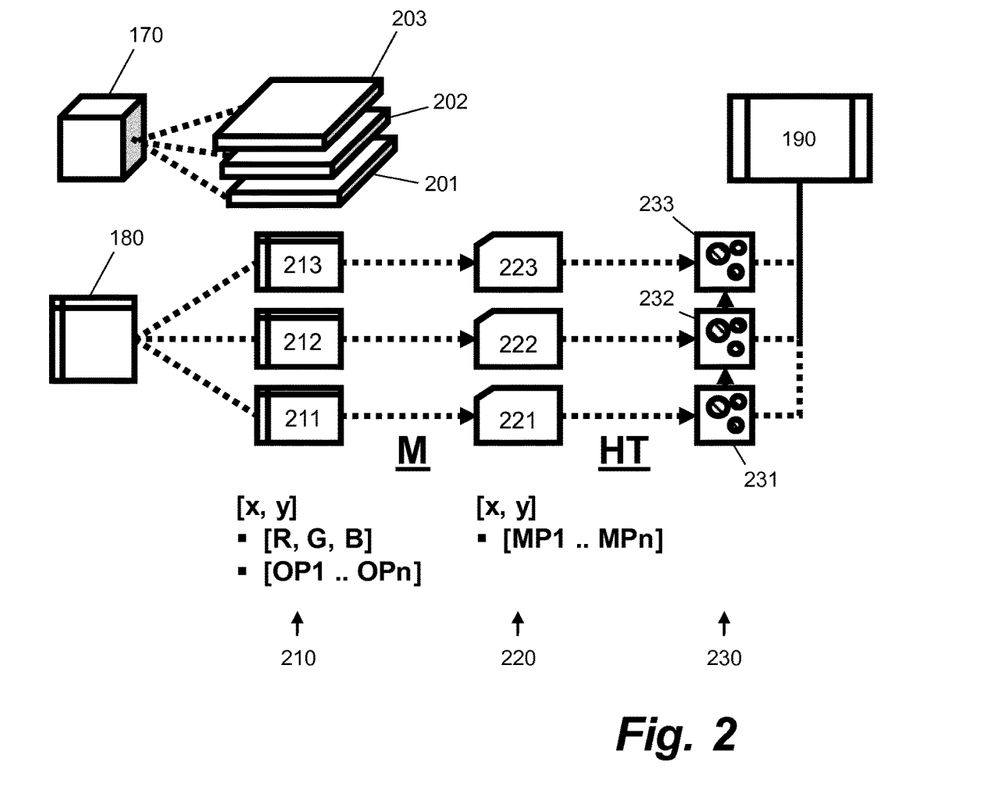
FIG. 2 is a simplified schematic illustration showing data manipulated by the apparatus according to an example.

FIG. 2 illustrates a process that may be applied by the apparatus 110 of FIG. 1 to generate control data for production of a three-dimensional object. FIG. 2 shows object model data 170, which defines an object model in a three-dimensional space. In FIG. 2, data 170 is deconstructed into rasterized representations 201, 202, 203 of three planes of the three-dimensional object, e.g. three z-slices of the model. If the object model data 170 defines the three-dimensional object in a vector form, e.g. in terms of define three-dimensional primitive objects, then a cross-section of the object as represented in vector form may be taken, and this cross-section may be converted to a raster object, e.g. a definition having pixel values and related properties. When referring to color data a raster object may also be known as a contone object, as it contains data indicative of a continuous color variable. In the apparatus of FIG. 1 this process is performed by the image processor 130.

In FIG. 2, each rasterized representation 201, 202, 203 has corresponding object property data 211, 212, 213. This object property data associated with each raster representation 211, 212, 213 is generated based on the received object property data 180. If the object property data 180 comprises material property values for each [x, y, z] co-ordinate then stage 210 may comprise splitting this data into values for [x, y] co-ordinates associated with each of the three z slices. For example, in FIG. 2 each [x, y] co-ordinate in each of the three planes one or more object property values [$OP_1$, $OP_2$, ..., $OP_n$], wherein an example of a color property [R, G, B] is also shown.

In certain cases, one or more material properties may also be inferred from the model of the three-dimensional object, e.g. as set out in the object model data 170. For example, one material property may comprise whether material is present, e.g. whether at a given location the object is to be filled with material or whether it is hollow. Additionally, or alternatively, a material property may be defined independently of the object model data 170. For example, a material property may indicate a minimum wall thickness or minimum strength for all locations in the object to be generated. Such a material property may be defined globally, e.g. one value for the object, and/or locally, e.g. different values associated with different portions of the object. In cases where the received object property data 180 is not explicitly mapped to a given location in the object model, e.g. the described case of a globally defined minimum wall thickness, then at stage 210 the object property value may be mapped to each location, e.g. a global value may be assigned to each individual [x, y, z] location.

In FIG. 2, the object property data 211, 212, 213 is mapped (M) to corresponding area coverage representations 221, 222, 223 at a second stage 220. This mapping may be performed by the separation generator 140 of FIG. 1. This mapping may comprise a pre-processing stage of taking a raster object representing a z-slice and passing it through a raster-to-separation process. This raster-to-separation process applies any present material property constraints. For example, this may comprise a process whereby a plane at a given height is intersected with a three-dimensional vector model from the object model data—which results in a contour (i.e. a two-dimensional) vector shape of the object at that height. This is then rasterized at a given print resolution. In this process object properties may arise as a consequence of the shapes involved; for example, thinner shapes may need different material placement, interior parts may use different materials, etc. Additionally object properties may result from defined inputs; for example a color of a surface may in turn determine the object properties of further interior elements. The mapping may comprise inputting values for the object property data 211, 212, 213 into a look-up table and retrieving an area coverage representation as an output. This may be performed for each pixel in each of the rasterized representation, e.g. it may be equivalent to mapping one or more values associated with a plurality of pixels in a two-dimensional image. Values for color and material properties within object property data 211, 212, 213 may be mapped separately or in a combined process. In FIG. 2 an [R, G, B] color value and one or more object property values [$OP_1$, $OP_2$, ..., $OP_n$] for each pixel in a z-slice are mapped to a Mac vector—[$MP_1$, $MP_2$, ..., $MP_m$]. This mapping therefore is a multi-dimensional mapping. An example method for generating a mapping is described later with reference to FIG. 4.

A third stage 230 shown in FIG. 2 comprises halftone data 231, 232, 233 for each of the planes of the three-dimensional object. The halftone data 231, 232, 233 is generated by applying a halftone (HT) operation to the area coverage representations 221, 222, 223 of the second stage 220. The halftone operation may be performed by the halftone generator 150 of FIG. 1. As part of the halftone operation area coverage values for other planes may be considered. For example, a 10% area coverage per slice may also be mapped in the z dimension, such that colorant and/or material deposition is repeated every 10 slices.

Each set of halftone data 231, 232, 233 may be used in turn to set control data 190 for the production of a corresponding layer of the three-dimensional object. In one case, there may be dynamic feedback from the production process. For example, following generation of halftone data 231 the first layer of the object may be produced, e.g. a layer corresponding to plane 201. Once this layer is generated, and/or during production, certain thermal and/or imaging parameters may be measured for the layer. For example, this may comprise capturing an infra-red and/or visible-range image of the produced layer. These measured parameters may then be used by one or more of the mapping and halftone operation for a subsequent plane of the object. For example, if a visible-light image for a layer shows an area coverage that differs from the calculated area coverage representation associated with the layer, e.g. due to variations introduced in the production process, then the area coverage representations and/or halftone data for subsequent layers may be suitably modified to meet the requirements of the original object model data 170 and object property data 180.

Figure 3:
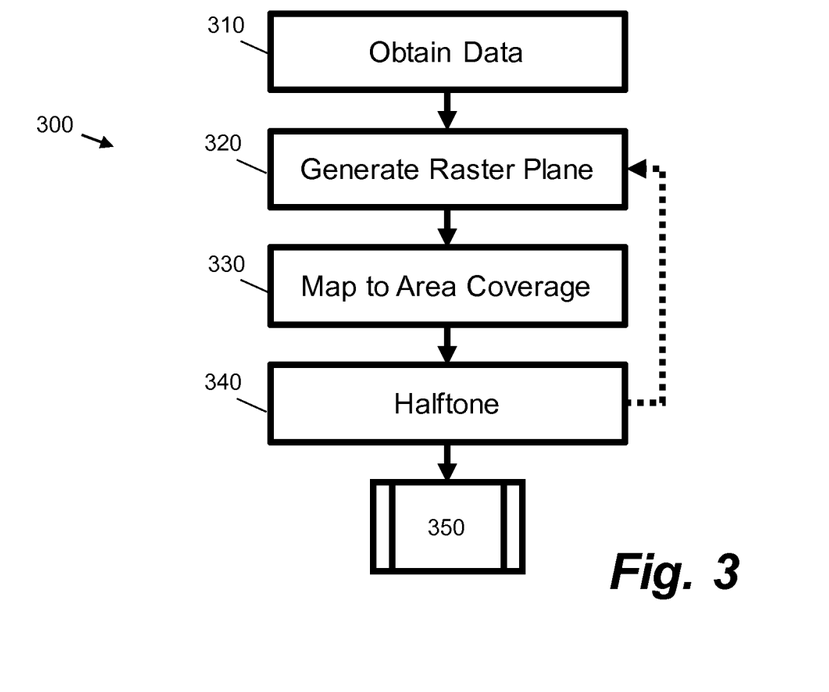
FIG. 3 is a flowchart showing a method for generating control data for the production of a three-dimensional object according to an example.

FIG. 3 shows a method 300 for generating control data for production of a three-dimensional object. The method 300 may be applied by the apparatus 110 or may generate the data shown in FIG. 2. Alternatively, the method 300 may be applied independently of the features of FIGS. 1 and 2.

At block 310, data representing a three-dimensional object to be generated is obtained. This data comprises object model data and object property data. At block 320, a raster object representing a plane of the three-dimensionally object is generated from the obtained data. At block 330, the raster object is mapped to an area coverage representation of the plane. The area coverage representation defines object property data at a given location in the plane as one or more proportions of a set of available object properties at the location, e.g. as a probability distribution of available materials. At block 340, the area coverage representation is halftoned to generate control data 350 for the production of the plane of the three-dimensional object. This may comprise threshold matrix halftoning a monochromatic, area-coverage defined plane for a slice of the object to be printed. As shown in FIG. 3, blocks 320 to 340 may be repeated to generate control data for a series of planes of the object, e.g. a series of z-slices that correspond to layers of the object to be generated. The control data 350 generated by the method 300 may be used, per plane, to produce a layer of the three-dimensional object using an additive manufacturing system.

In certain cases, the area coverage representation for a plane comprises material area coverage values, e.g. may comprise a Mac vector as described above. For example, an area coverage representation of [K:0.2, Z:0.8] may represent 20% of one drop of a black material and 80% left empty, or an area coverage representation of [K: 0.1, W: 0.1, Z: 0.8] may represent 10% of one drop of a black material, 10% of a transparent or white material and 80% left empty. In one example, a black material in the form of a colorant may be used to absorb energy and as such solidify a build material at a location where it is applied, e.g. may be used as a coalescing agent. In this case, a strength or rigidity material property may be mapped to an area coverage of black colorant; high strength or rigidity may be mapped to an area coverage of 100% and low strength or rigidity may be mapped to an area coverage of 20%. After halftoning this results in control data that with one of two discrete states for a location in a given layer—a drop of black colorant or no drops of black colorant. However, a given area will have distributions of black material that match the area coverage values that, following application of energy, result in the desired material property values.

In one case, feedback from the additive manufacturing system is received following block 340. In this case one or more of the repeated generating 320, mapping 330 and halftoning operations 340 may incorporate this feedback to modify the resultant control data for a subsequent plane of the three-dimensional object. The generating 320, mapping 330 and halftoning operations 340 may be respectively implemented by the image processor 130, separation generator 140 and halftone generator 150 of FIG. 1.

Figure 4:
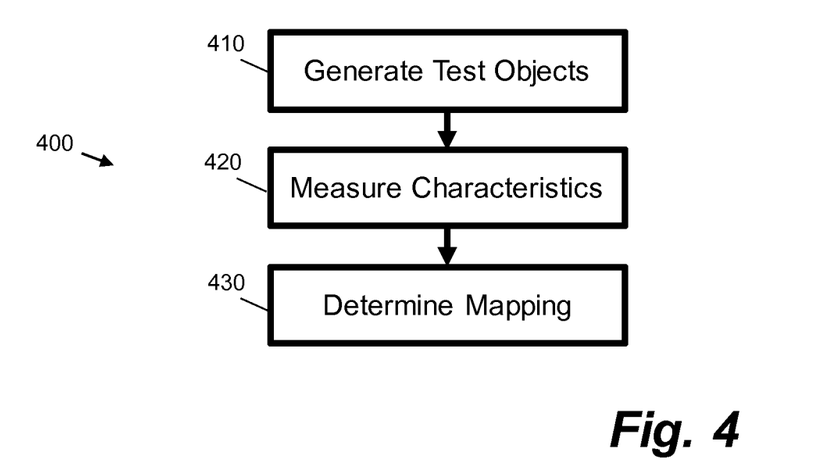
FIG. 4 is a flowchart showing a method for generating a mapping according to an example.

FIG. 4 shows a method 400 that may be used to generate a mapping for use in block 330. The method 400 may also be used to generate a look-up table for use by the separation generator 140 of FIG. 1. The method of FIG. 4 is performed in relation to a specified additive manufacturing system.

At block 410 a plurality of test objects are produced by the additive manufacturing system. Each test object is defined to have one or more pre-defined proportions of a set of available object properties at a pre-defined location of the test object. For example, each test object may relate to a given Material Primary. In particular, a set of test objects for a given Material Primary may have a range of area coverage values. For example, in an additive manufacturing system that uses a black colorant as a coalescing agent, then the presence of the black colorant (K) may be an MP and the absence (Z) of the black colorant may also be an MP: an Mac vector of [K, Z]. Hence, test objects may be generated that have Mac vectors of: [0, 1], [0.1, 0.9], [0.2, 0.8], [0.3, 0.7], [0.4, 0.6], [0.5, 0.5], [0.6, 0.4], [0.7, 0.3], [0.8, 0.2], [0.9, 0.1] and [1, 0], e.g. a range of 0 to 100% in 10% area coverage increments. Each test object may be a set three-dimensional shape, e.g. a predefined oblong with a minimum height. The height may be set to a minimal value for the successful measurement of a required material property.

At block 420 one or more characteristics at the pre-defined location of each three-dimensional test object are determined. This may comprise measuring material properties at the pre-defined location. For example, in a color case the pre-defined location may be measured with one or more of a spectrophotometer and a gloss meter. In another material property case, a materials testing may be used, such as a universal testing machine for measuring tensile and compressive strength. The form of the measurement may depend on the object property being measured and the build materials used to generate the test object.

Having determined one or more characteristics at the pre-defined location of each three-dimensional test object, at block 430 a mapping is determined between input object property data at a given location of a three-dimensional object and one or more proportions of a set of available object properties at the given location based on the measured characteristics.

In one case, block 430 comprises determining a gamut of available object properties based on the one or more measured characteristics, wherein the one or more proportions output by the mapping are within the gamut. The gamut may be a volume in a multi-dimensional space representative of the object properties. For example, the one or more measured characteristics may be associated with the area coverage values used to generate the test object. If a range of measured characteristic values are associated with a corresponding range of area coverage values, then a relationship between the characteristic and area coverage may be derived. For example, measured compressive strength may be a linear or non-linear function of a K MP value. These relationships may be multi-dimensional if a plurality of MP values are used to generate the test objects.

In one example determining the gamut may comprise determining an initial gamut of available object properties based on the one or more measured characteristics. In certain cases, it may not be possible to output a full range of object properties, e.g. limitations of the additive manufacturing system may mean that theoretically available object properties, like a given rigidity value, are not possible in practice. To accommodate a material limit may be applied to the initial gamut to determining a limited gamut of available object properties, wherein the limited gamut of available object properties is indicative of object properties that are producible with a given additive manufacturing system. For example, there may be minimum and/or maximum area coverage values for certain MPs, or for certain MP combinations. If colorants in the form of inks are used there may be overall ink limits for the additive manufacturing system. In certain cases material-use optimizations per color may be applied. This may comprise computing both minimum and maximum material use and combining them, e.g. in a linear approximation, to get to an area coverage X for any color. In certain cases the range of possible area coverages may vary by color. This may lead to constraints on the gamut, e.g. constraints on the available colors. For example, if at least X1 area coverage has to be covered for a given color but no more than X2 area coverage should be covered, this may be used as a set of constraints to determine the available color gamut for the additive manufacturing system. In certain cases a material "limit" may be defined as the maximum amount of material per unit area, e.g. by weight. If materials have a common weight such a limit may relate to the maximum area coverage for a color X2; if this is not the case one or more limits may be applied as one or more additional constraints on the gamut.

In one case, determining a mapping between input object property data at a given location of a three-dimensional object and one or more proportions of a set of available object properties at the given location comprises generating a look-up table with object property data values as input nodes and one or more proportions of a set of available object properties as output nodes. In this case output nodes may be selected from values within the gamut of available object properties based on a material-use optimization. For example, an optimization may be applied to, amongst others: minimize material use; to distribute material use amongst available materials, e.g. in relation to cost or availability; and to minimize or maximize a particular object property such as strength or surface roughness. Optimizations may be parameterized by area coverages, either for individual materials or overall for a set of available materials.

FIGS. 5A to 5C, 6 and 7 relate to an example additive manufacturing system that may be used in conjunction with the previously described examples. This additive manufacturing system makes use of a coalescing agent and a coalescing modifier agent. These agents allow a three-dimensional object to have varying material properties. They may be combined with one or more colored build materials to generate multi-color objects with varying material properties. Although a particular additive manufacturing system is presented as an example, the apparatus and methods described above may be applied to other additive manufacturing systems. These include, amongst others, selective laser sintering systems, stereo lithography systems, inkjet systems, fused deposition modelling systems, any three-dimensional printing system, inkjet deposition systems and laminated object manufacturing systems. These include systems that directly deposits build materials may be used, rather than those described that use various agents.

Figures 5A, 5B, 5C:
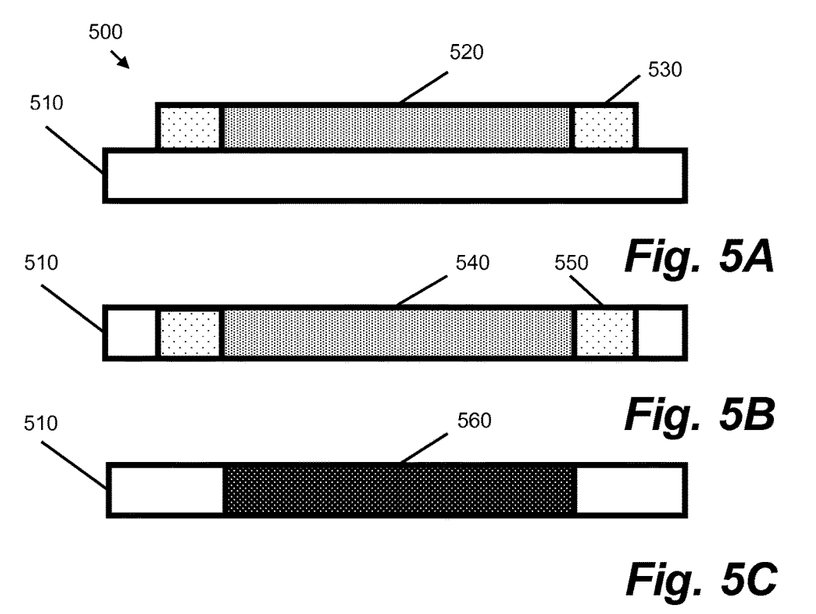
FIGS. 5A to 5C are schematic illustrations of a process for building a layer of a three-dimensional object according to an example.

FIGS. 5A to 5C shows a series 500 of cross-sections of a layer or layers of build material according to one example. In FIG. 5A, a first layer of build material 510 is provided on a suitable support member (not shown). In one example the thickness of the layer of build material provided is in the range of about 90 to 110 microns, although in other examples thinner or thicker layers of build material may be provided. The example of FIGS. 5A to 5C uses a coalescing agent 520 and a coalescence modifier agent 530 selectively delivered to one or more portions of the surface of the layer 510 of build material. The selective delivery of the agents 520 and 530 is performed in accordance with control data for the layer. This control data may be control data 190 or 350 as described with reference to any one of FIGS. 1 to 3. By selective delivery is meant that both coalescing agent and coalescence modifier agent may be delivered to selected portions of the surface layer of the build material in respective independent patterns. These patterns may be determined by a Mac. For example, in one case the coalescing agent 520 may comprise a black colorant, such as an ink-type formulation comprising carbon black. The coalescing modifying agent 530 may comprise any agent that prevents the build material solidifying. For example, it may comprise a liquid that comprises solids, a salt solution, a fluid that exhibits a suitable cooling effect, a suitable plasticizer or a surface tension modifier. The layer 510 may comprise one or more build materials. These may include powdered semi-crystalline thermoplastic materials. They may also comprise powdered metal materials, powdered composited materials, powder ceramic materials, powdered glass materials, powdered resin material, powdered polymer materials, and the like.

FIG. 5B shows that the agents 520 and 530 delivered to the surface of the build material penetrate into the layer 510 of build material, for example at locations 540 and 550. The degree to which the agents penetrate may differ between the two different agents, or may be substantially the same. The degree of penetration may vary depending on the configuration of the additive manufacturing system.

Following the penetration of the agents 520 and 530 into the layer 510, a predetermined level of energy is temporarily applied. In one example the energy applied is infra-red or near infra-red energy, although in other examples other types of energy may be applied, such as visible light, microwave energy, ultra-violet (UV) light, halogen light, ultra-sonic energy or the like. The length of time the energy source is applied and/or the type of energy source may vary depending on the configuration of the additive manufacturing system. The temporary application of energy causes portions of the build material on which coalescing agent has been delivered or has penetrated 540 to heat up above the coalescing point of the build material and to coalesce. Upon cooling, the portions which have coalesced become solid and form part of the three-dimensional object being generated. One such portion is shown as portion 560 in FIG. 5C. In the present example, the portions of the build material on which coalescing modifier agent has been delivered or has penetrated 550 do not coalesce following application of the energy source. In this example this helps reduce the effects of lateral coalescence bleed. This may be used, for example, to improve the definition or accuracy of object edges or surfaces, and/or to reduce surface roughness. In another example, coalescence modifier agent may be delivered interspersed with coalescing agent which may be used to enable object properties to be modified. The process shown in FIGS. 5A to 5C may be repeated for subsequent layers of build material associated with subsequent z-slices of a three-dimensional model.

Figure 6:
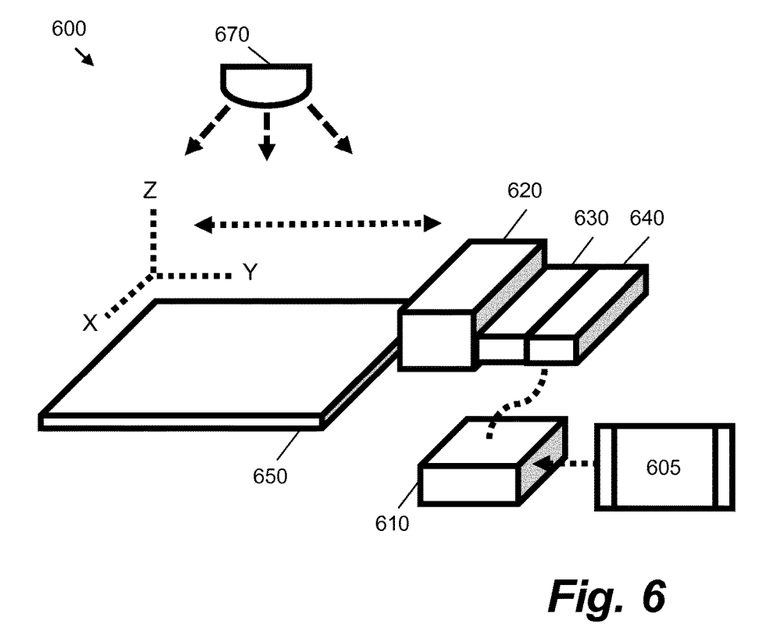
FIG. 6 is a simplified isometric illustration of an additive manufacturing system according to an example.

FIG. 6 shows a simplified isometric illustration of an additive manufacturing system 600 according to an example. This system 600 may be used to apply the process shown in FIGS. 5A to 5C.

The system 600 comprises a system controller 610 that controls the general operation of the additive manufacturing system 600. In this example the system controller 610 is arranged to receive control data 605. This may comprise control data 190 and/or 350 that relates to one or more layers of a three-dimensional object to be generated. In FIG. 6, the systems controller 610 is arranged to control the actions of one or more of a build material distributor 620, a coalescing agent distributor 630 and a coalescence modifier agent distributor 640. In certain cases, the systems controller 610 is also arranged to control one or more colorant distributors. Suitable build material distributors may include, for example, a wiper blade and a roller. One or more additional material and/or agent distributors may also be provided. Through control of these distributors one or more build materials, one or more agents and one or more colorants may be deposited on either a support structure 650 or previously deposited layers. An energy source 670 is also provided that applies energy to deposited layers on the support structure 650. The energy source may apply a uniform level of energy to the deposited layers and/or may comprise an addressable and/or directable energy source, such as a laser.

In one case at least the agent distributors 630 and 640 may comprise printheads, such as thermal printheads or piezo inkjet printheads. One or more of the support structure 650 and the distributors 620 to 640 may be arranged to move in one or more dimensions. As such build material, agents and/or colorants may be applied to addressable locations in three-dimensions.

Figure 7:
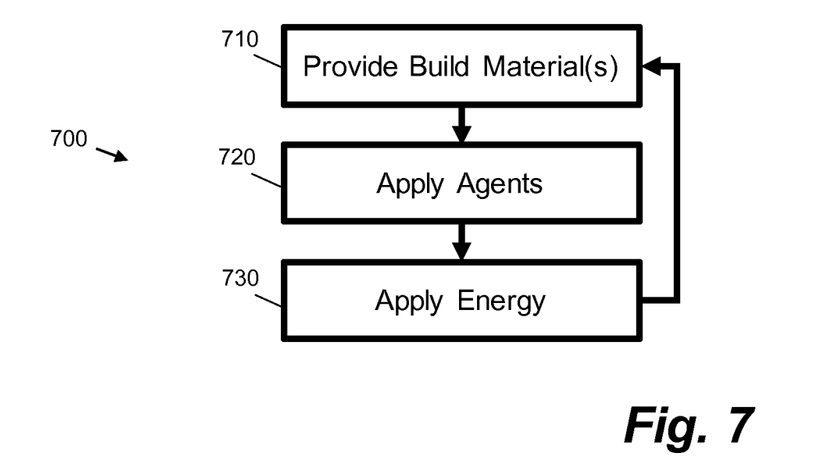
FIG. 7 is a flow diagram outlining a method of operating an additive manufacturing system according to an example.

FIG. 7 shows a method 700 for additive manufacturing that may be applied by the additive manufacturing system 600. At block 710 a layer of build materials is provided. In certain cases a plurality of build materials may be selectively deposited. At block 720 one or more agents are selectively applied to the layer according to supplied control data. At block 730 energy is applied to coalesce select portions of the layer according to the deposit of the agents. In certain cases either before or after one or more of blocks 720 and 730 one or more further materials may be deposited. The method 700 may be repeated for multiple layers to construct a three-dimensional object.

In relation to the examples of FIGS. 5A to 5C, 6 and 7, an area coverage value may be associated with an area coverage of one or more build materials, agents and/or colorants. Where a material property is mapped to an area coverage, the area coverage may provide a desired heat dissipation that results in the appropriate material property. For example, in cases where the coalescing agent is a black colorant, an area coverage value instructs use of a proportion of the coalescing agent and the proportion of coalescing agent that is applied to a given area of a layer results in different levels of coalescence when an energy source is applied, which in turn affects the structural and/or mechanical characteristics of portions of the object present in the layer. Similarly object properties such as "hollow" or "filled in" may be mapped to proportions of coalescing modifier agent, as well as or instead of different proportions of coalescing agent.

For example, in a black and white case it could be 'gray-scale' in order to indicate the % coverage of a single K channel, in another instance it could be RGB color but where material properties are mapped to specific nodes—e.g. the interior of an object if it is to be filled in may be processed to use 'white' ink, e.g. a coalescence modifier agent, and the borders of a hollow object will always have to have a transition of X pixels width from white to full color. As a more general example, an object may be defined that at a particular [x, y, z] location has [RGB] color and [interior/exterior] property values (or other similar 'modifiers'). In this case, if at [x, y, z] and color RGB the modifier is 'interior' it gets mapped to a certain Mac vector, if the modifier is 'exterior' then the Mac vector may be different. This allows for intelligent manipulation of materials; for example if a cheap material is rough a mapping may be configured such that it is not used on an interior surface but is used in the interior of the object. This may be the case even if the cheap material has color information as it may not be seen if located a particular distance into the interior of an object.

Certain examples described herein provide a mechanism for specifying material properties and/or color in the context of additive manufacturing systems. Certain examples use a mapping stage that makes use of area coverage values and a halftoning operation. This differs from comparative systems wherein single colorants are directly mapped to discrete areas of an object to be printed in a one-to-one fashion. These comparative systems thus do not allow for transitions in material properties.

In one example, before generating a rasterized representation, mapping the rasterized representation and halftoning the area coverage representation, a set of visible planes of the three-dimensional object may be determined. Hence, before the method of FIG. 3 is applied, halftoning is applied to the set of visible planes. This enables the surface color of the object to be treated separately. Surfaces of an objection may be halftoned in isolation and maintained in their state as "edge" pixels, whereas an interior of an object may be handled as per the method of FIG. 3. The colors of the interior of the object may affect the surface color in certain cases, in that they implement an area coverage perpendicular to the surface plane. In this case, determining the visible planes or locations of the object may inform the material properties, e.g. prioritizing color or finish/roughness at a given location. As such it may form part of a raster-to-separation process to define the material properties at a location.

Certain systems and methods as described herein are suitable for single color and/or material processing. In these cases, the area coverages of a single colorant and/or material may be considered. In general, certain systems and methods described herein provide an ability to combine materials in a 'continuous' way, e.g. provide an ability to print color and/or other material property transitions. Certain systems and methods enable control of an area coverage over a given plane. In certain cases, a material separation can be co-optimized over a set of given planes, e.g. across a plurality of z-slices. In certain cases the systems and methods enable direct control of an amount of material over a particular plane or z-slice. It is possible to transition dynamically between pre-computed minimum and maximum material-use optimizations of materials in a continuous, linear way. Certain systems and methods enable color and other material properties to be either considered in conjunction with each other or separately. For example, area coverage vectors may, as well as applying to colorants, equally apply to combining various materials at different proportions. This provides an ability to trade-off material properties and color. For example, for a given set of area coverage ranges and colorant-use ranges, a first gamut may be available. By changing the ranges different gamuts are available. Certain systems and methods also provide an ability to control both area coverages and colorant or material-use dynamically, e.g. in a closed-loop feedback system where levels need to be adjusted due to actual heat-map analysis or deformations.

Figure 8:
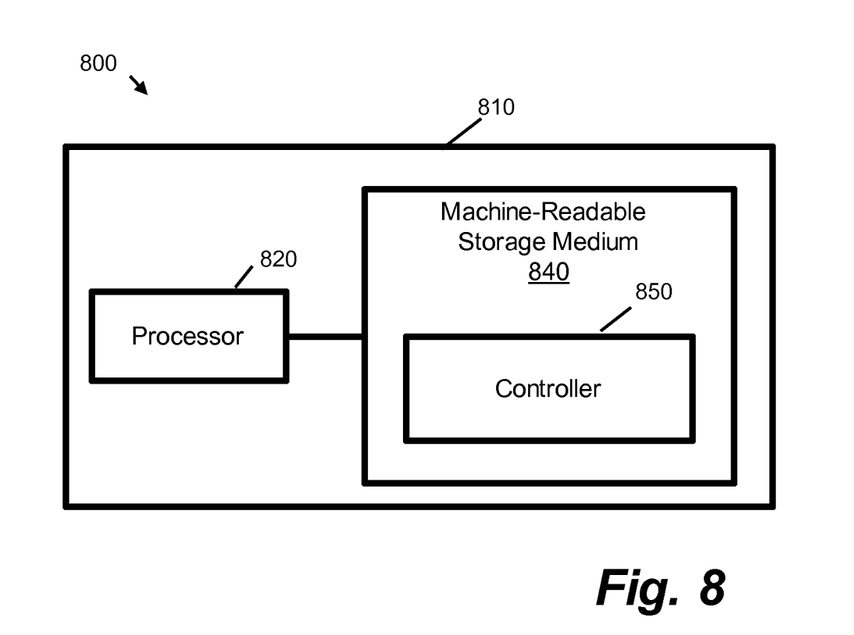
FIG. 8 is a simplified schematic illustration of a controller for an additive manufacturing system according to an example.

Certain methods and systems as described herein may be implemented by a processor that processes computer program code that is retrieved from a non-transitory storage medium. FIG. 8 shows an example 800 of a control system 810 comprising a machine-readable storage medium 840 coupled to a processor 820. In certain case the control system 810 may comprise a computer; in other cases the control system may comprise an embedded computing device, e.g. adapted for use in controlling an additive manufacturing system. Machine-readable media 840 can be any media that can contain, store, or maintain programs and data for use by or in connection with an instruction execution system. Machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc. In FIG. 8, the machine-readable storage medium comprises program code to implement a controller 850, this may implement the apparatus 110 of FIG. 1, the systems controller 610 of FIG. 6, or any of the methods of FIGS. 3, 4 and 7. Components of the Figures, such as those shown in FIG. 1, may be implemented by a common processing system and/or may comprise dedicated hardware modules and/or software modules. In certain cases, the machine-readable storage medium may also comprise one or more mappings, e.g. look-up tables for use by the separation generator 140 which may be in the form of a spectral separation look-up table.

The preceding description has been presented to illustrate and describe examples of the principles described. This description is not intended to be exhaustive or to limit these principles to any precise form disclosed. Many modifications and variations are possible in light of the above teaching.

What is claimed is:

1. An additive manufacturing system, comprising:
a production system to:
generate a plurality of three-dimensional test objects each having one or more pre-defined proportions of a set of available object properties at a pre-defined location of the test object; and
determine one or more measured characteristics at the pre-defined location of each three-dimensional test object; and
a control system to:
determine a gamut of available object properties based on the one or more measured characteristics;
obtain object model data and object property data representing a three-dimensional object to be generated;
generate a rasterized representation of a plane of the three-dimensional object from the obtained object model data and object property data;
map the rasterized representation to an area coverage representation of the plane that defines object property data at a given location in the plane as one or more proportions within the gamut of available object properties of a set of build materials and their combinations at the location; and
halftone the area coverage representation to generate control data for the production of the plane of the three-dimensional object.

2. The apparatus of claim 1, wherein:
the object model data is defined using co-ordinates in a three-dimensional space;
the object property data comprises a color value at one or more co-ordinates; and
the control system is to map a color value at a given co-ordinate to a material area coverage vector at the given co-ordinate.

3. The apparatus of claim 1, wherein:
the object model data is defined using co-ordinates in a three-dimensional space;
the object property data comprises at least one material property value at one or more co-ordinates; and
the control system is to map a material property value at a given co-ordinate to a material area coverage vector at the given co-ordinate.

4. A method for generating control data for production of a three-dimensional object, comprising:
generating a plurality of three-dimensional test objects each having one or more pre-defined proportions of a set of available object properties at a pre-defined location of the test object;
determining one or more measured characteristics at the pre-defined location of each three-dimensional test object;
determining a gamut of available object properties based on the one or more measured characteristics;
obtaining object model data and object property data representing a three-dimensional object to be generated;
generating a rasterized representation of a plane of the three-dimensional object from the obtained object model data and object property data;
mapping the rasterized representation to an area coverage representation of the plane that defines object property data at a given location in the plane as one or more proportions within the gamut of available object properties of a set of build materials and their combinations at the location; and
halftoning the area coverage representation to generate control data for the production of the plane of the three-dimensional object.

5. The method of claim 4, wherein the area coverage representation comprises one or more of material area coverage values.

6. The method of claim 4,
wherein the object model data is defined using co-ordinates in a three-dimensional space and the object property data comprises at least one material property at one or more co-ordinates; and
wherein the plane of the three-dimensional object corresponds to a plane within the object model data with a set value for one of the co-ordinates.

7. The method of claim 4, wherein mapping the rasterized representation to an area coverage representation of the plane comprises applying a mapping between at least one object property data value and a material area coverage vector.

8. The method of claim 4, comprising, before generating a rasterized representation, mapping the rasterized representation and halftoning the area coverage representation:
determining a set of visible planes of the three-dimensional object; and
applying halftoning to the set of visible planes.

9. The method of claim 4, comprising:
producing, using an additive manufacturing system, a layer of the three-dimensional object based on the control data;
receiving feedback from the additive manufacturing system; and
repeating the generating, mapping and halftoning operations for a subsequent plane of the three-dimensional object, wherein at least one of the generating and mapping operations incorporate the received feedback.

10. The method of claim 4, wherein determining the gamut comprises:
determining an initial gamut of available object properties based on the one or more measured characteristics;
applying one or more of a material limit to the initial gamut to determining a limited gamut of available object properties,
wherein the limited gamut of available object properties is indicative of object properties that are producible with a given additive manufacturing system.

11. The method of claim 4, wherein determining a mapping between input object property data at a given location of a three-dimensional object and one or more available object properties at the given location comprises:
generating a look-up table with object property data values as input nodes and material area vectors that address the available object properties as output nodes, including selecting the output nodes from values within the gamut of available object properties based on one or more of a material-use optimization.

* * * * *

UNITED STATES PATENT AND TRADEMARK OFFICE
CERTIFICATE OF CORRECTION

PATENT NO. : 10,416,656 B2
APPLICATION NO. : 15/514767
DATED : September 17, 2019
INVENTOR(S) : Peter Morovic et al.

Page 1 of 1

It is certified that error appears in the above-identified patent and that said Letters Patent is hereby corrected as shown below:

On the Title Page

In Column 2, item (57), Abstract, Line 8, after "representation" insert -- of the plane. The area coverage representation --.

In the Claims

In Column 13, Line 41, Claim 2, delete "apparatus" and insert -- additive manufacturing system --, therefor.

In Column 13, Line 49, Claim 3, delete "apparatus" and insert -- additive manufacturing system --, therefor.

Signed and Sealed this
Third Day of December, 2019

Andrei Iancu
*Director of the United States Patent and Trademark Office*